June 22, 1943.    H. J. MURPHY    2,322,656
SNAP FASTENER FOR TRIMMING AND LIKE STRIPS
Filed Dec. 9, 1941

Inventor:
Howard J. Murphy.
By John Todd
Att'y.

Patented June 22, 1943

2,322,656

UNITED STATES PATENT OFFICE 2,322,656

SNAP FASTENER FOR TRIMMING AND LIKE STRIPS

Howard J. Murphy, Greenwood, Mass., assignor to United-Carr Fastener Corporation, Cambridge, Mass., a corporation of Massachusetts Application December 9, 1941, Serial No. 422,253

6 Claims. (Cl. 24—73)

My invention aims to provide improvements in fastener members (particularly snap fasteners) for use in combination with a trim strip installation and particularly the fastening of a trim strip of molded or other similar material to a metal supporting panel.

In the drawing, which illustrates a preferred embodiment of my invention:

I am aware of the fact that I am not the first one to secure a specially formed strip, which may be a piece of phenolic condensate material, to a supporting member by means of a snap fastener. I believe, however, that my snap fastener, which will be more fully hereinafter described, is constructed in such a manner that it does a better job of fastening the phenolic condensate material to the support than any previously known fastener.

Figure 1:
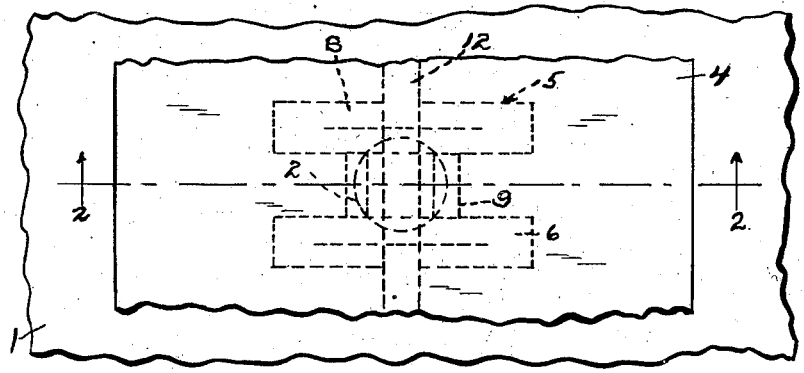
Fig. 1 is a plan view of a portion of an installation showing my improved fastener member in dotted lines.
Figure 2:
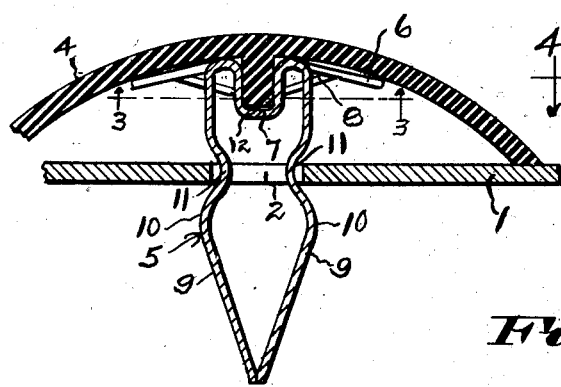
Fig. 2 is a section taken on the line 2—2 of Fig. 1 with the left-hand portion thereof broken away.

Merely for the purpose of illustration and description my invention comprises a supporting member preferably of relatively thin sheet material 1 having one or more apertures 2, a preformed strip of decorative material 4 and one or more snap fasteners 5 securing the decorative material 4 to the support 1, as shown in Figs. 1 and 2.

Figure 3:
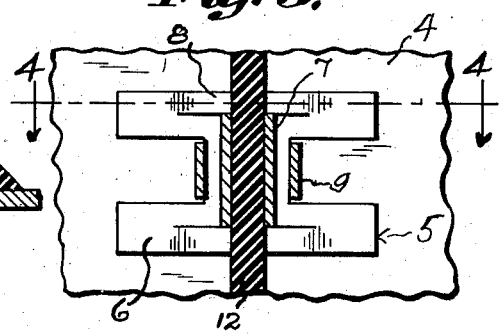
Fig. 3 is a bottom plan section taken on the line 3—3 of Fig. 2.

The particular snap fastener member 5 that I have chosen for illustration by the drawing is formed from a single piece of sheet metal and has a base portion 6 preferably bowed longitudinally and generally H-shaped. The central portion of the base 6 is bent into a fold providing a fastener-aligning means 7 and the base is also slit to provide yieldable fastener-attaching portions 8 arranged in pairs at opposite ends of the fold 7, as illustrated in Fig. 3. The remaining portions of the base provide yieldable portions the purposes of which will be hereinafter more fully described. The fastener also includes a pair of legs 9—9 extending from the central portion of the base in a direction which is the same as the direction of the fold and the direction of the bow of the base. These legs 9—9 cooperate to form a shank and combine to provide a head portion 10 and a neck portion 11.

Figure 4:
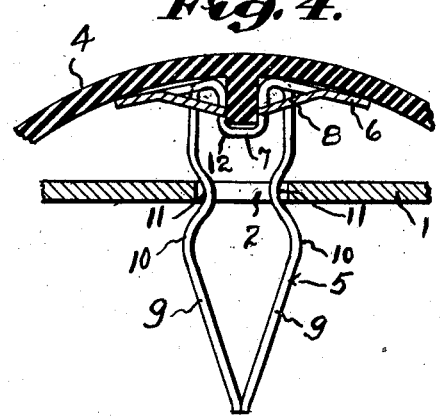
Fig. 4 is a section taken on the line 4—4 of Fig. 3.

When it is desired to assemble the parts of the installation, I preferably attach the fastener member to the phenolic strip 4 by engaging the fold or aligning portion 7 over a central rib 12 formed on the under side of the strip 4, as shown in Fig. 2. As the fastener is placed over the rib 12 the ends of the fastener-attaching fingers 8, which intersect the space provided by the fold 7, engage the edge faces of the rib 12 and are swung downwardly relative to the base and away from each other so that the rib may pass between them and their ends may engage with the side faces of the rib. As the application of the fastener continues the free ends of the bowed base first come in contact with the under surface of the part 4 and thereby the base is flexed slightly when the fastener is pushed into final position. Thus the base aids in holding the fastener-attaching portions 8 in strong gripping engagement with the side faces of the rib 12, as best illustrated in Fig. 4.

Figures 5, 6:
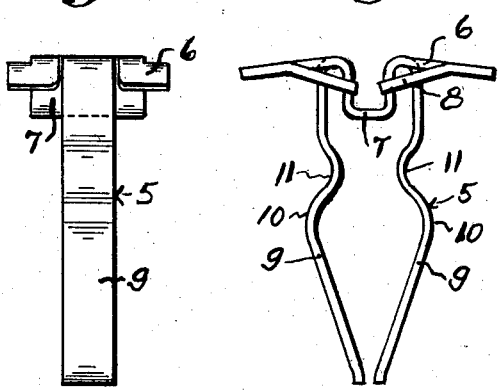
Fig. 5 is an edge view of my improved fastener member per se.
Fig. 6 is a side view of the fastener member shown in Fig. 5.

If the part 4, which is to be attached to the support 1, is of substantial length, then it is desirable to place more than one fastener upon the rib 12. After the desired number of fasteners have been attached to the part 4, in the manner described, then the part 4 may be assembled with the support 1 by entering the legs 9—9 of each fastener through a cooperating aperture 2 and pressing on the outer face of the strip 4. Since the diameter of the head portion 10 is greater than the diameter of the aperture 2, the legs are forced toward each other as they pass through the aperture and the head portion compresses permitting the portion 4 to be brought into direct contact with the surface of the support 1 at its edges, as indicated in Fig. 2, especially when the part 4 is a hollow member, as indicated in the drawing. When the edges of the part 4 are brought into direct contact with the supporting part 1 the neck portion 11 of each fastener engages with the wall surrounding an aperture 2 thereby firmly holding each fastener in gripping-engagement with the supporting part 1. This neck portion is of such diameter that it does not return to its normal dimension (indicated in Fig. 6) but is held under tension thereby causing the ends of the legs 9—9 to remain in contact, as indicated in Figs. 2 and 4. Thus when the parts of the installation are assembled the fasteners are held under tension and the installation is held very securely.

My improved fastener members are relatively simple in construction, quite easy to manufacture and are particularly efficient, especially due to the construction of the base and its associated portions which provide a secure means by which the fasteners are attached to the rib or other similar aligning means which cooperates with the folded portion or other similar aligning means of the fastener.

While I have illustrated and described a preferred embodiment of my invention, I do not wish to be limited thereby because the scope of my invention is best defined in the accompanying claims.

I claim:

1. A fastener member of the class described comprising a base having a fastener-aligning portion in the form of a central fold providing a longitudinal groove for receiving a projecting aligning means provided by a part to which the fastener is to be attached, fastener-attaching means whereby said fastener member may be attached to said part and other fastening means for engagement with a support for said part.

2. A fastener member of the class described comprising a base having a fastener-aligning portion in the form of a fold for cooperation with an aligning means provided by a part to which the fastener is to be attached, fastener-attaching means in the form of gripping fingers whereby said fastener member may be attached to said part and other fastening means for engagement with a support for said part.

3. A fastener member of the class described formed from a single piece of metal and having a base with a central fold to receive a projection on a part for the purpose defined, yieldable fingers extending from said base in the same direction as said fold and intersecting the space provided by said fold for gripping the projection of said part, and other portions cooperating to provide a fastening means whereby the fastener member and part are secured to a support.

4. A fastener member of the class described formed from a single piece of metal and having a base with a central fold to receive a projection on a part for the purpose defined, yieldable fingers extending from said base in the same direction as said fold and intersecting the space provided by said fold for gripping the projection of said part, and other portions cooperating to provide a fastening means whereby the fastener member and part are secured to a support, said yieldable fingers being grouped in pairs at opposite ends of the said fold.

5. A fastener member of the class described formed from a single piece of metal and having a base with a central fold to receive a projection on a part for the purpose defined, yieldable fingers extending from said base in the same direction as said fold and intersecting the space provided by said fold for gripping the projection of said part, and other portions cooperating to provide a fastening means whereby the fastener member and part are secured to a support, and said base being bowed lengthwise so as to make yieldable contact with said part thereby to apply additional pressure to the gripping of said fingers on said projection.

6. A fastener member of the class described comprising a base having a fastener-aligning portion in the form of a fold for cooperation with an aligning means provided by a part to which the fastener is to be attached, fastener-attaching means in the form of gripping fingers whereby said fastener member may be attached to said part and other fastening means for engagement with a support for said part, and said base being bowed lengthwise so as to make yieldable contact with said part thereby to apply additional pressure to the gripping of said fingers on said projection.

HOWARD J. MURPHY.